(12) United States Patent
Yamauchi

(10) Patent No.: US 6,529,221 B2
(45) Date of Patent: Mar. 4, 2003

(54) ELECTROPHOTOGRAPHIC APPARATUS

(75) Inventor: Kazumi Yamauchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/950,724

(22) Filed: Sep. 12, 2001

(65) Prior Publication Data

US 2002/0030726 A1 Mar. 14, 2002

(30) Foreign Application Priority Data

Sep. 13, 2000 (JP) ....................................... 2000-278848

(51) Int. Cl.[7] ................................................ B41J 2/385
(52) U.S. Cl. ............................ 347/132; 347/31; 399/51
(58) Field of Search ................................ 347/129, 131, 347/225, 132, 236; 399/51, 4, 177

(56) References Cited

U.S. PATENT DOCUMENTS

| | | | | |
|---|---|---|---|---|
| 5,115,259 A | * | 5/1992 | Itoh | 347/131 |
| 5,412,408 A | * | 5/1995 | Itoh et al. | 347/132 |
| 5,715,499 A | | 2/1998 | Yamazaki et al. | 399/50 |
| 6,388,689 B1 | * | 5/2002 | Toda et al. | 347/132 |

FOREIGN PATENT DOCUMENTS

JP 3052052 4/2000

* cited by examiner

Primary Examiner—Susan S. Y. Lee
(74) Attorney, Agent, or Firm—Fitzpatrick, Cella, Harper & Scinto

(57) ABSTRACT

An object of the present invention is to provide an electrophotographic apparatus that has a photosensitive body, a charging member, provided to be capable of contacting with the photosensitive body, for charging the photosensitive body, an oscillating voltage being applied to the charging member, and exposing device for exposing the photosensitive body charged by the charging member, by an exposure beam based on image information to form an electrostatic image, wherein when a spot ratio which is a ratio of a spot diameter of the exposure beam to a size of one pixel of the electrostatic image is represented by $\alpha$, a pixel density of the electrostatic image is represented by R (dot/mm), a process speed of the photosensitive body is represented by V (mm/sec), a frequency of the oscillating voltage is represented by f (Hz) and a NESA sensitivity of the photosensitive body is represented by $\gamma(V \cdot cm^2/\mu m)$, $2.5 \leq \alpha$, $4.2 \leq R \times V/f \leq 7.0$, and $2,000 \leq \gamma$ are satisfied.

10 Claims, 10 Drawing Sheets

FIG. 4

| | f (Hz) | SPOT DIAMETER (μm) | α | β (R*V/f) | MOIRE | CHARGING SOUND | LATERAL STREAK |
|---|---|---|---|---|---|---|---|
| EXPERIMENTAL EXAMPLE 1 | 1200 | 60 | 2.83 | 4.72 | GOOD | GOOD | GOOD |
| COMPARATIVE EXAMPLE 1 | 1200 | 40 | 1.89 | 4.72 | FAIL | GOOD | GOOD |
| COMPARATIVE EXAMPLE 2 | 800 | 60 | 2.83 | 7.09 | GOOD | GOOD | FAIL |
| EXPERIMENTAL EXAMPLE 2 | 900 | 70 | 3.31 | 6.30 | GOOD | GOOD | FAIR |
| COMPARATIVE EXAMPLE 3 | 2000 | 30 | 1.42 | 2.83 | GOOD | FAIL | GOOD |

FAIR---- SLIGHT IN PRACTICAL GRAPHIC PATTERN, THEREBY NO PROBLEM

FIG. 7

| | RESOLUTION (DPI) | PROCESS SPEED V (mm/sec) | SPOT DIAMETER (μm) | NESA SENSITIVITY (V·cm²/μm) | LINE WIDTH (μm) | DOT REPEATABILITY | MOIRE |
|---|---|---|---|---|---|---|---|
| EXPERIMENTAL EXAMPLE 3 | 1200 | 120 | 60 | 2200 | 180 | GOOD | GOOD |
| COMPARATIVE EXAMPLE 4 | 1200 | 120 | 60 | 500 | 175 | FAIL | GOOD |
| COMPARATIVE EXAMPLE 5 | 1200 | 120 | 30 | 500 | 185 | GOOD | FAIL |

FIG. 11

| | SPOT DIAMETER (μm) | NESA SENSITIVITY (V·cm²/μm) | α | DOT CONNECTION | MOIRE | REPEATABILITY OF SMALL DOT IMAGE |
|---|---|---|---|---|---|---|
| EXPERIMENTAL EXAMPLE 4 | 60 | 2500 | 2.83 | GOOD | GOOD | GOOD |
| EXPERIMENTAL EXAMPLE 5 | 90 | 2500 | 4.25 | FAIL | GOOD | GOOD |
| COMPARATIVE EXAMPLE 6 | 40 | 2500 | 1.89 | GOOD | FAIL | GOOD |
| EXPERIMENTAL EXAMPLE 6 | 90 | 3800 | 4.25 | FAIL | GOOD | GOOD |
| COMPARATIVE EXAMPLE 7 | 90 | 500 | 4.25 | GOOD | GOOD | FAIL |

ELECTROPHOTOGRAPHIC APPARATUS

BACKGROUND OF THE INVENTION

1. Field of the Invention

The present invention relates to an electrophotographic apparatus such as a printer, copier or facsimile for forming an image according to electrophotographic system.

2. Related Art

Image forming apparatuses which make use of electrophotographic system, such as laser printers and LED printers are now widely used. Along with the spread of personal computers, low-cost printers are now in demand. Laser beam system is characterized by easier exposure control in comparison with LED system and can provide an inexpensive image forming apparatus.

The processing of a photographic image by an individual user is made possible by a reduction in the cost of a high-performance personal computer, and a high-resolution printer capable of outputting the processed photographic image is desired. Meanwhile, as progress is being made in the networking of offices to enable a plurality of users to use a printer at the same time, high-speed printers are also in demand.

Thus, when the resolution and the process speed are high, the revolution speed of a scanner increases in a laser beam printer, whereby a large driving power source is required and a rotary support shaft must be reinforced, thereby increasing the size of the scanner or apparatus. Since the emission time per pixel becomes short, a high-output laser chip is required, thereby boosting the cost of the apparatus.

To solve the above problems, multi-beam system is effective that a plurality of laser beams are used for scanning to form an electrostatic latent image of a plurality of lines on an electrophotographic sensitive body.

Most of inexpensive charging devices for charging an electrophotographic sensitive body employ contact charging system. This system does not require a high-voltage power source and an ozone filter, and a charging member of this system may be simply composed of a roller. As this contact charging system, the applicant of the present application has proposed system that voltage to be applied to the contact charging member is oscillating voltage (Japanese Patent Publication No. 3-52058). In this system, the peak value of oscillating voltage is set to two times or more the charging start voltage when DC is applied to the charging member to enable uniform charging.

According to studies conducted by the present inventor, when a contact charging member for applying oscillating voltage is used to charge an electrophotographic sensitive body and the resolution and the process speed are increased, a defective image called "moire image" is obtained upon the output of a line image. This is an interference fringe which is formed when periodical slight potential fluctuations caused by the oscillating voltage of charging are close to the pitch of the line image. This moire image will be described hereinbelow.

When the process speed is represented by V (mm/sec), the frequency of charging voltage (AC component) is represented by f (Hz), the density (resolution) of pixels is represented by D (dot/mm), the number of dots of the line width of the line image is represented by N, the number of dots between lines of the line image is represented by M, the line pitch is represented by L (=(N+M)/D) (mm/cycle) and the value of space frequency calculated from the charging frequency f is represented by fp (=f/V) (cycle/mm), if the space frequency fp (cycle/mm) of charging and the space frequency 1/L (cycle/mm) of an image are close to each other, an interference fringe which is formed in an image of arbitrary N and M having the relationship of the following equation (1) is called "moire image".

$$fp=f/V=1/L=D/(N+M) \qquad (1)$$

To prevent this phenomenon, the space frequency of charging frequency is made much larger than the space frequency of an image or set to a frequency other than the space frequency of the image in the prior art.

However, as is understood from the equation (1), when the resolution D is high, the charging frequency f which can avoid the moire image becomes high. For example, when a moire image can be avoided by setting the charging frequency to 600 Hz at 400 dpi, a charging frequency of 1,800 Hz is required at 1,200 dpi. However, when the charging frequency is set to a high level, charging sound becomes big corresponding to frequency disadvantageously.

It is also understood from the equation (1) that when the process speed (mm/sec) is high, the charging frequency must be made high.

SUMMARY OF THE INVENTION

It is an object of the present invention to provide an electrophotographic apparatus which prevents a moire image.

It is another object of the present invention to provide an electrophotographic apparatus which can reduce charging sound.

It is still another object of the present invention to provide an electrophotographic apparatus which enables uniform charging even with the increased resolution and process speed.

It is a further object of the present invention to provide an electrophotographic apparatus in which the repeatability of small-dot image formed of 1 dot or several dots is improved.

It is a still further object of the present invention to provide an electrophotographic apparatus which can form an electrostatic image having a big difference of potential even with the large spot diameter of an exposure beam.

Other objects and features of the present invention will become more apparent from the following description taken in connection with the accompanying drawings.

BRIEF DESCRIPTION OF THE DRAWINGS

FIG. 4 is a diagram showing the evaluation results of Embodiment 1 of the present invention;

FIG. 7 is a diagram showing the evaluation results of Embodiment 1 of the present invention;

FIG. 11 is a diagram showing the evaluation results of Embodiment 2 of the present invention.

DETAILED DESCRIPTION OF THE PREFERRED EMBODIMENTS

Preferred embodiments of the present invention will be described hereinbelow.

<Embodiment 1>

Figure 1:
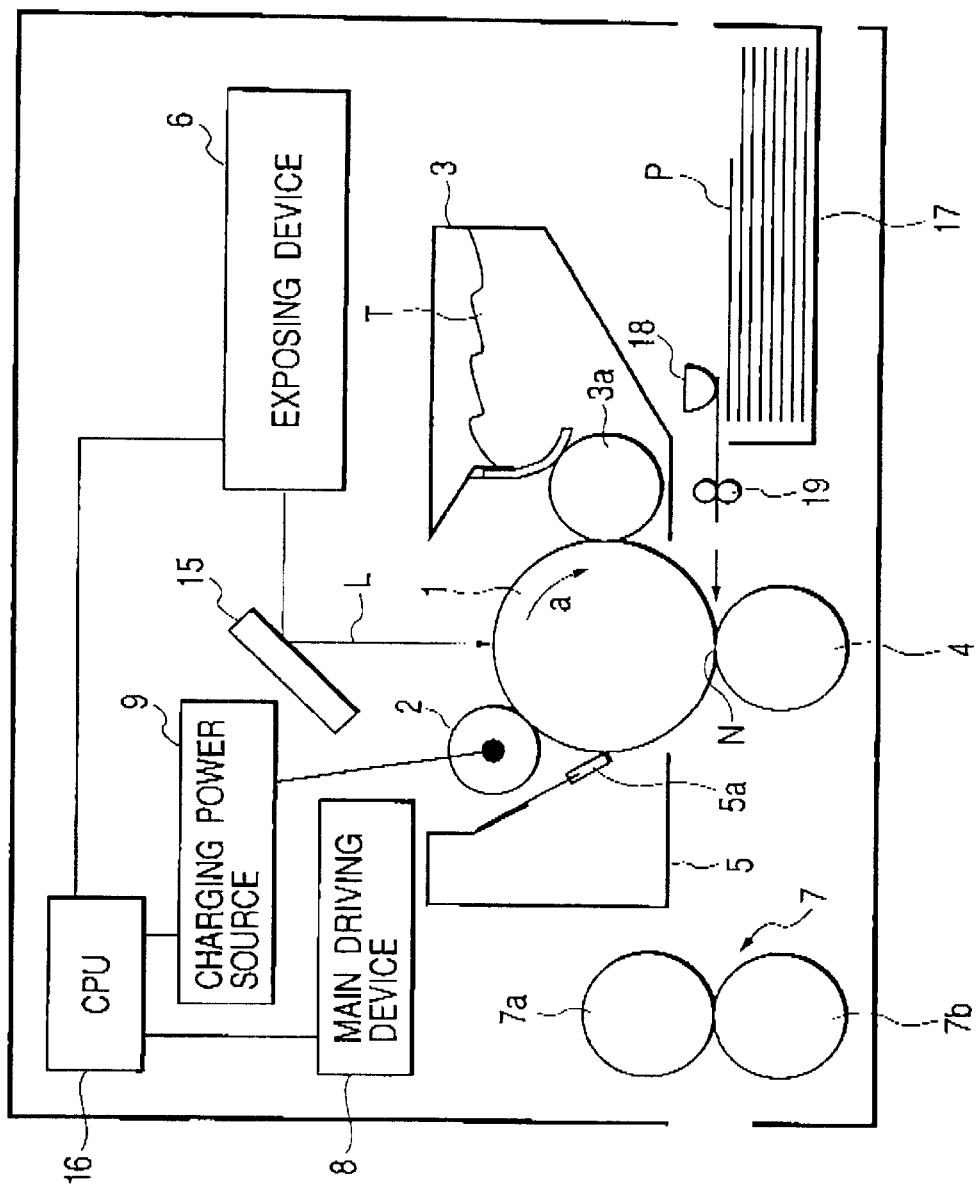
FIG. 1 is a schematic structural diagram of an image forming apparatus according to Embodiments 1 and 2 of the present invention.

FIG. 1 is a schematic structural diagram of an image forming apparatus according to Embodiment 1 of the present invention. This image forming apparatus is an electrophotographic laser beam printer which employs contact charging system.

This image forming apparatus comprises a drum type electrophotographic photosensitive body 1 as an image bearing member (referred to as "photosensitive drum" hereinafter), and a charging roller 2 as a contact charging member, developing apparatus 3, transferring roller 4 and cleaning apparatus 5 are arranged around the photosensitive drum 1. An exposing device 6 is arranged above the portion between the charging roller 2 and the developing apparatus 3. A fixing apparatus 7 is disposed at a downstream side in a conveyance direction of a transferring material P of a transfer nipping portion N formed between the photosensitive drum 1 and the transferring roller 4.

The photosensitive drum 1 has a photosensitive layer (not shown) of an optically conductive material on an aluminum conductive drum substrate (not shown) and is rotated in a direction shown by an arrow "a" (clockwise) at a predetermined speed (process speed) by driving a main driving device 8. The photosensitive drum 1 is uniformly charged negatively by the charging roller 2 in contact therewith during rotation. The photosensitive drum 1 in this embodiment will be described in detail hereinafter.

Figure 2:
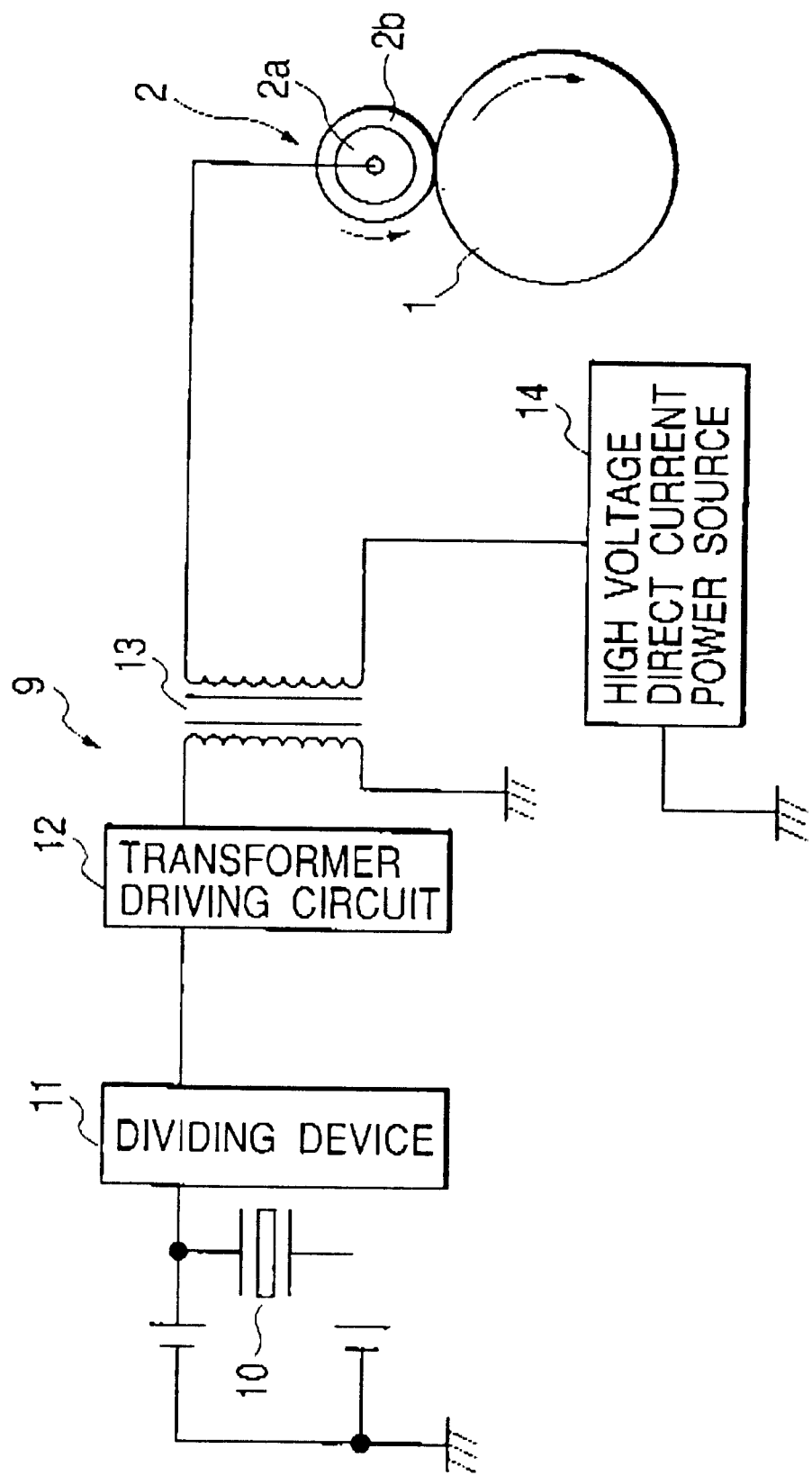
FIG. 2 is a schematic structural diagram of a charging power source for the image forming apparatus according to Embodiments 1 and 2 of the present invention.

As shown in FIG. 2, the charging roller 2 as the contact charging member comprises a cored bar 2a and a conductive rubber roller portion 2b formed on the surface of the cored bar 2a. The charging roller 2 is rotatably supported by an unshown bearing, press-contacted to the surface of the photosensitive drum 1 by an unshown pressure spring with a predetermined pressure and rolled by the rotation of the photosensitive drum 1.

The charging roller 2 is connected to a charging power source 9. As shown in FIG. 2, the charging power source 9 comprises an oscillator 10, dividing device 11, transformer driving circuit 12, high-voltage transformer 13 and high-voltage direct current power source 14. A system clock supplied from the oscillator 10 is divided into a charging frequency f (Hz) by the dividing device 11, and the charging frequency f is applied to the primary coil of the high-voltage transformer 13 through the transformer driving circuit 12 to generate a sinusoidal wave AC high-voltage to the secondary coil side. Since the high-voltage direct current power source 14 is connected to one end of the secondary coil side, charging bias which is an oscillating voltage obtained by superimposing AC high voltage with DC high voltage is supplied to the charging roller 2 through a contact plate (not shown) in contact with the cored bar 2a.

The developing apparatus 3 has a developing sleeve 3a which incorporates a fixed developing magnet roller (not shown). Negatively charged toner T as a developer is coated on the developing sleeve 3a and adhered to an electrostatic latent image formed on the photosensitive drum 1 at a developing position to develop (visualize) it as a toner image. Predetermined developing bias is applied to the developing sleeve 3a from a developing power source (not shown).

The transferring roller 4 as a contact transferring means is rotated in press contact with the surface of the photosensitive drum 1 by a predetermined pressure, and predetermined transferring bias is applied to the transferring roller 4 from a transferring bias power source (not shown) to transfer a toner image on the surface of the photosensitive drum 1 to the transferring material P conveyed to the transfer nipping portion N between the photosensitive drum 1 and the transferring roller 4.

The laser output portion (not shown) of the exposing device 6 outputs a laser beam (exposure beam) modulated in response to the time sequence electric digital image signal of image information input from a host computer (not shown) to scan and expose L the surface of the photosensitive drum 1 charged through a reflection mirror 15 so as to form an electrostatic latent image on the surface of the photosensitive drum 1.

The fixing apparatus 7 has a rotatable fixing roller 7a and a pressure roller 7b and heats and presses the toner image transferred to the surface of the transferring material P by a fixing nip between the fixing roller 7a and the pressure roller 7b to thermally fix the image. The exposing device of Embodiment 2 which will be described hereinafter employs double beam laser system which generates two laser beams whereas the exposing device 6 of the above embodiment employs single beam laser system which generates one laser beam.

The controls of the developing apparatus 3, the transferring roller 4 and the fixing apparatus 7 including the exposure control of the exposing device 6, the drive control of the main driving device 8 and the charging bias control of the charging power source 9, the control of image forming conditions in this embodiment to be described hereinafter, and the like are carried out by a controller (CPU) 16.

The image forming operation of the above image forming apparatus will be described hereinbelow.

When image information is input from a host computer (not shown), the photosensitive drum 1 is rotated at a predetermined speed in a direction shown by the arrow "a" (clockwise direction) by driving the main driving device 8, and the surface of the photosensitive drum 1 is uniformly charged to a predetermined potential by the charging roller 2 to which charging bias (oscillating voltage obtained by superimposing AC voltage with DC voltage) is applied from the charging power source 9. The surface of the charged photosensitive drum 1 is scanned and exposed by a laser beam from the exposing device 6 through the reflection mirror 15, whereby the potential of the scanned and exposed portion of the photosensitive drum 1 drops to form an electrostatic latent image corresponding to the input image signal.

Toner t charged the same polarity as the charging polarity (negative) of the photosensitive drum 1 is adhered to the electrostatic latent image formed on the photosensitive drum 1 by the developing sleeve 3a of the developing apparatus 3 to which developing bias having the same polarity as the charging polarity (negative) of the photosensitive drum 1 is applied to reversibly develop (visualize) the latent image as a toner image in a developing portion.

Meanwhile, the transferring material P such as paper in a cassette 17 is carried to a registration roller 19 by a sheet feeding roller 18 in synchronism with the formation of a toner image on the photosensitive drum 1. When the head of the toner image on the photosensitive drum 1 reaches the transfer nip N between the photosensitive drum 1 and the transferring roller 5, the transferring material P is carried to the transfer nipping portion N by the registration roller 14 with this timing. The toner image on the photosensitive drum 1 is transferred to the transferring material P carried to the transfer nipping portion N by the transferring roller 4 to which transferring bias having polarity (positive polarity) opposite to the toner thanks to electrostatic force generated between the photosensitive drum 1 and the transferring roller 4.

The transferring material P having the transferred toner image is carried to the fixing apparatus 7 in which the toner image is heated and pressed against the transferring material P by a fixing nip between the fixing roller 7a and the pressure roller 7b to be thermally fixed. The transferring material P is discharged to the outside to complete a series of image formation operations. After the transfer of the toner image, the residual toner existent on the photosensitive drum 1 is removed and collected by a cleaning blade 5a of the cleaning apparatus 5.

In the present example, as image formation conditions for forming the above image, the ratio of the spot diameter of an exposure beam (laser beam) irradiated from the exposing device 6 to the size of one pixel obtained from the density of pixels, i.e., the spot ratio $\alpha$ is 2.5 or more ($2.5 \leq \alpha$), and when the density of pixels is represented by R (dot/mm), the process speed is represented by V (mm/sec) and the frequency of AC voltage (oscillating voltage) applied from the charging power source 9 is represented by f (Hz), the number$\beta$(=R×V/f) (dot/cycle) of dots per cycle of charging voltage satisfies $4.2 \leq \beta \leq 7.0$. The above spot diameter is a diameter obtained when the output of an exposure beam becomes $1/e^2$ of the maximum value.

Thus, even when the resolution and the process speed are high, charging sound can be made small while an excellent image is retained. The above conditions ($2.5 \leq \alpha$ and $4.2 \leq \beta \leq 7.0$) will be described hereinbelow.

Figure 3:
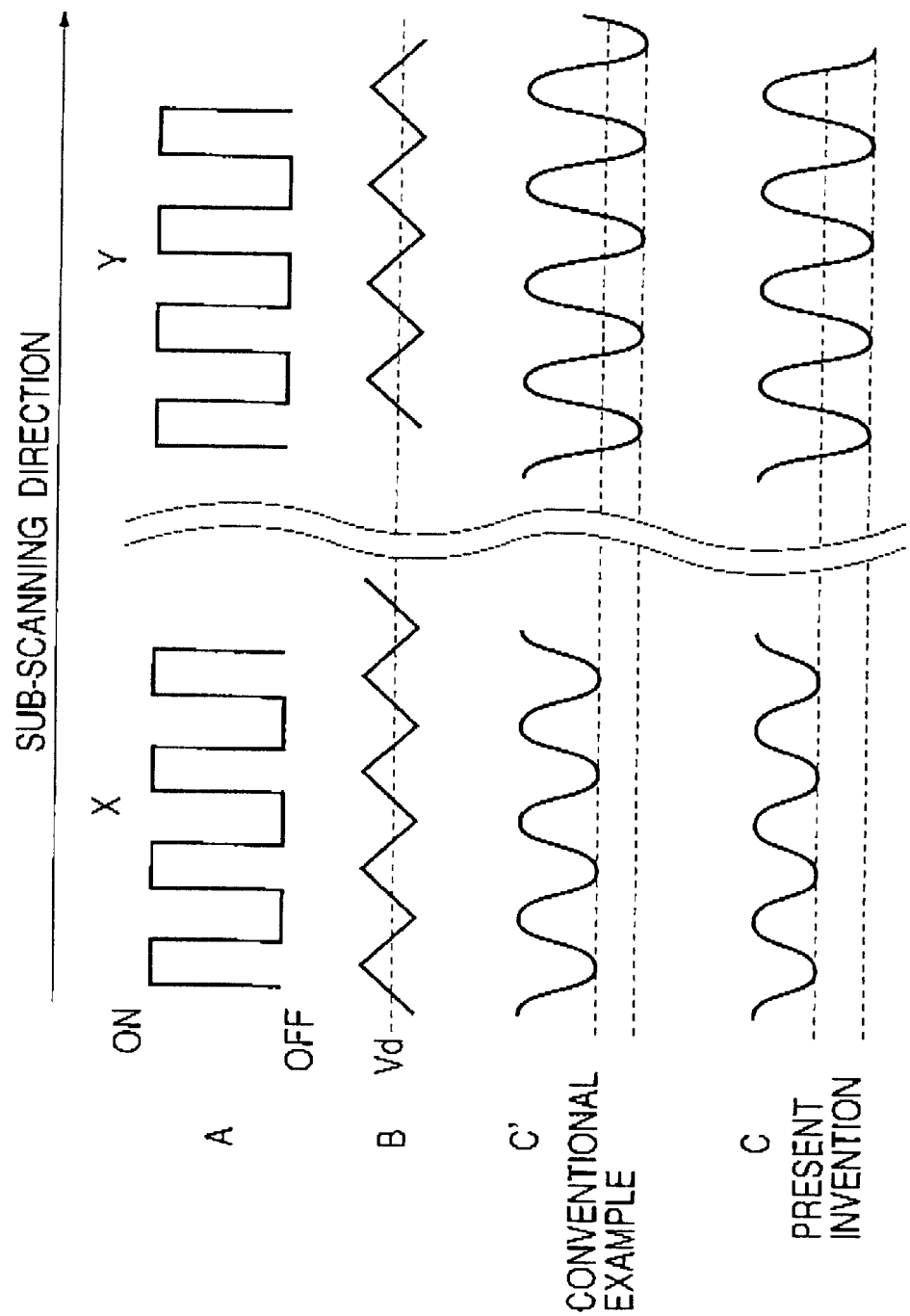
FIG. 3 is a diagram explaining the formation of a moire image.

First, the above moire image which becomes a problem when the resolution and the process speed are high will be described with reference to FIG. 3. "A" at positions X and Y in FIG. 3 is an on/off signal for a laser beam (exposure beam) at 1,200 dpi, and "B" indicates fluctuations in potential (potential Vd of a dark portion) on the surface of the photosensitive drum 1 after charging and before exposure and is the pitch of space frequency of charging voltage.

"C'" indicates the shape of an electrostatic latent image when the spot diameter of an exposure beam (laser beam) is 30 $\mu$m in the prior art. The electrostatic latent image is sharply concave after exposure. Since a dark portion having a high potential (Vd) is exposed in a portion shown by X, the potential (V1) of a bright portion after exposure is high and the line width thereof is small. Since a portion having a low potential Vd is exposed in a portion shown by Y, the line width thereof is large. The image is shaded by repetitions of this. Since fluctuations in Vd potential are small and the charging frequency is high, an image problem does not arise generally. However, when the cycle of fluctuations in the potential of the portion shown by X and the cycle of the line images almost agree with each other, the fluctuations in Vd potential appear visually as changes in the line width of low frequency.

Studies conducted by the present inventor have revealed that a moire image is markedly formed when the shape of the electrostatic latent image portion is close to a rectangular wave and hardly formed when the shape is close to a triangular wave. This is considered that the rectangular wave interferes with the line image more easily than the triangular wave because the space is less irregular in shape.

"C" indicates the shape of an electrostatic latent image when the spot diameter of an exposure beam (laser beam) is 60 $\mu$m in the present invention. In this case, the spot diameter is large compared with fluctuations in potential caused by charging frequency, and the shape of the electrostatic latent image is mountain (valley)-like. Therefore, since changes in line width are not clearly periodical, the formation of a moire image can be prevented.

FIG. 4 shows the evaluation results of the generation of a moire image, charging sound and a lateral streak image in Embodiment 1 of the present invention and Comparative Examples 1 to 4 when image formation conditions such as charging frequency and the spot diameter are changed at a resolution of 1,200 dpi, a pixel density of 47.2 ($\mu$m/dot) and a process speed of 120 (mm/sec). In the image forming apparatus of this embodiment of the present invention, the resolution was set to 1,200 dpi, the pixel density to 47.2 ($\mu$m/dot), the process speed to 120 (mm/sec), the charging frequency to 1,200 (Hz) and the spot diameter to 60 ($\mu$m).

When the charging frequency is too low in this evaluation, it tends to fall within the frequency range that fluctuations in potential are easily visualized. Therefore, a half-tone and periodical lateral streak image is formed. Consequently, to prevent this lateral streak image, it is found that the number $\beta$ of dots (=R×V/f) per cycle of charging voltage must be adjusted to 7.0 or less, preferably 6.30 or less.

As a result of studies on the evaluation results, by adjusting the ratio of the spot diameter of an exposure beam (laser beam) to the size of one pixel, that is, the spot ratio $\alpha$ to 2.5 or more, preferably 2.83 or more, and the number $\beta$ of dots (=R×V/f) per cycle of charging voltage to a range of 4.2 to 7.0, preferably 4.72 to 6.30, in the image forming apparatus of Experimental Example 1, the formation of a moire image and a lateral streak image could be prevented. Further, in the image forming apparatus of Experimental Example 1 which satisfies the above conditions ($2.5 \leq \alpha$ and $4.2 \leq \beta \leq 7.0$), charging sound could also be suppressed. A moire image was formed in Comparative Example 1, and a lateral streak image was formed in Comparative Example 2. A very slight lateral streak image was formed in Experimental Example 2, but its actual image was at a level which does not cause a problem. Charging sound was big in Comparative Example 3. That is, to reduce charging sound, $4.2 \leq \beta$ is preferred.

Figure 5:
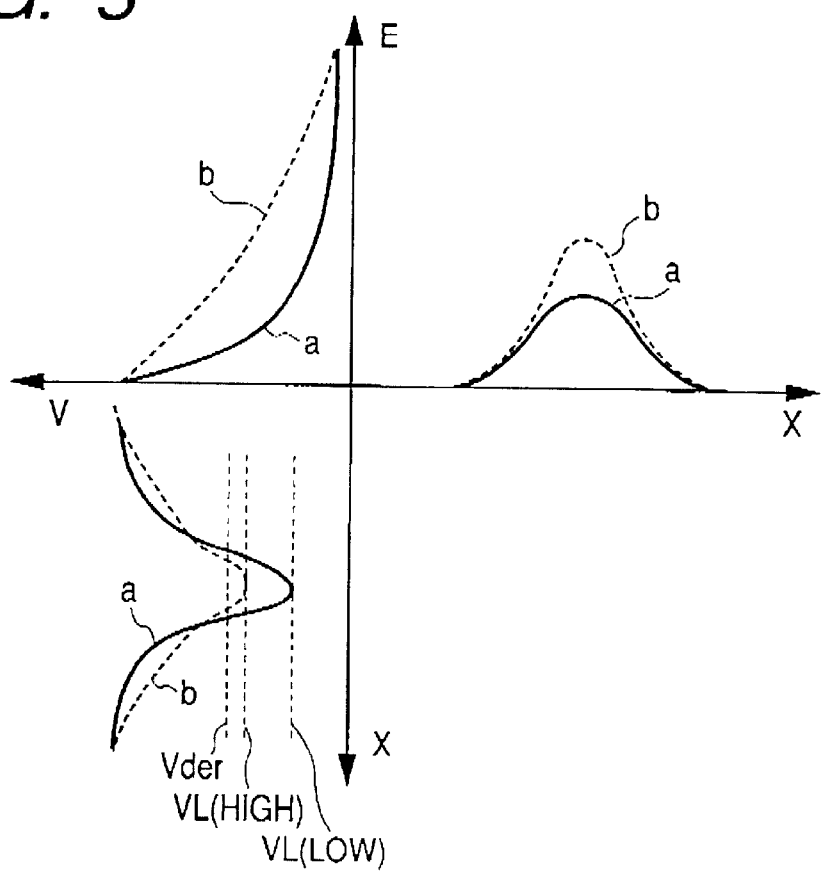
FIG. 5 is a diagram showing the relationships among the light quantity distributions of exposure beams, the sensitivity characteristics of photosensitive drums and electrostatic latent images formed on the photosensitive drums in Embodiment 1 of the present invention and a conventional example.

In the image forming apparatus of Embodiment 1 of the present invention, the photosensitive drum 1 had an NESA sensitivity $\gamma$ of 2,000 (V·cm$^2$/$\mu$m) or more. The NESA sensitivity of the photosensitive drum 1 was obtained from the quantity of light when the voltage of a photosensitive layer formed on NESA glass became −200V by irradiating light having a wavelength of 700 (nm) at 23° C. after the photosensitive layer formed on NESA glass was charged to −700V. By using the photosensitive drum 1 having a NESA sensitivity γ of 2000 (V·cm²/μm) or more, even when the spot diameter is large (2.5≦α), a sufficiently deep latent image can be formed, thereby making it possible to retain repeatability of small-dot image This will be described with reference to FIG. 5. FIG. 5 shows the relationship among the light quantity distribution of an exposure beam, the sensitivity characteristics of the photosensitive drum 1 and the electrostatic latent image formed on the photosensitive drum 1.

The first quadrant shows the light quantity distributions of exposure beams in this embodiment "a" and the prior art "b" and the axis of abscissa indicates the position X and the axis of ordinate indicates the quantity E of light. The second quadrant shows the sensitivity characteristics of the photosensitive drums in this embodiment "a" and the prior art "b" and the axis of ordinate indicates the quantity E of light and the axis of abscissa indicates the potential V of the photosensitive drum. The third quadrant shows the potential distributions of electrostatic latent images projected by adding the sensitivity characteristics of the photosensitive drums to the light quantity distributions of exposure beams in this embodiment "a" and the prior art "b" and the axis of abscissa indicates potential V and the axis of ordinate indicates the position X.

Since the photosensitive drum 1 of this embodiment "a" and the photosensitive drum of the prior art "b" in the second quadrant had NESA sensitivities of 2,200 and 500, respectively, the quantity of light was adjusted to obtain the same line width. The quadrant shows results obtained when the spot diameter was adjusted to 60 μm in this embodiment and the prior art. It is understood from the second quadrant that the potential can be reduced fully with a lower quantity of light than in the prior art "b" because the sensitivity of the photosensitive drum 1 of this embodiment "a" is sufficiently high. When a predetermined quantity or more of light is irradiated, the potential becomes almost equal to the residual potential determined by the photosensitive drum 1 and fixed.

According to the third quadrant, an electrostatic latent image formed when the photosensitive drum having the sensitivity characteristics of the prior art "b" is used has a small development contrast Δ (Vd−VL (high)) and cannot be developed fully with a developer (toner T) by the developing apparatus 3 as the potential at the center of exposure becomes VL (high) when the spot diameter is large. When the quantity of laser light is increased, a whole electrostatic latent image becomes deep and the line width becomes large, resulting in a reduction in service life.

In contrast to this, when the photosensitive drum 1 having the sensitivity characteristics of the embodiment of the present invention is used, a portion near the center of the spot is substantially in the residual potential region of the second quadrant. Therefore, the latent image becomes stable in shape near the center of the spot and has a high development contrast (Vd−VL (low)), which is effective in the repeatability of small-dot image. Since an area outside the center is suitably inclined, the prevention of a moire image can be kept.

Figure 6:
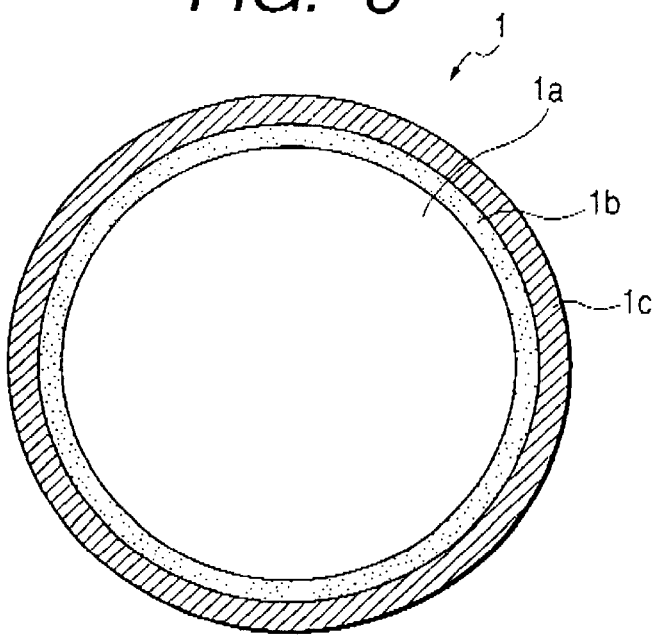
FIG. 6 is a structural diagram of a photosensitive drum for the image forming apparatus according to Embodiment 1 of the present invention.

Details of the photosensitive drum 1 in the above embodiment will be described hereinbelow. As shown in FIG. 6, the photosensitive drum 1 has an underlying layer (not shown), charge generation layer 1b and charge transport layer 1c formed on the surface of a conductive drum substrate 1a.

The drum substrate 1a is formed by molding a metal such as aluminum, copper or stainless steel into a drum form. The charge generation layer 1b is formed by dispersing a charge generation substance such as a titanyl phthalocyanine pigment into a binder resin such as acrylic resin, polystyrene or polyvinyl acetate and coating this dispersion. The thickness of the charge generation layer 1b is about 0.1 to 3 μm. The charge transport layer 1c is formed by coating a coating solution prepared by dissolving a charge transport substance such as a polycyclic aromatic compound having such a structure as main-chain anthracene, pyrene or biphenylene in a polycarbonate or polyester having film forming properties. The thickness of the charge transport layer 1c is about 10 to 30 μm.

The photosensitive drum 1 used in this embodiment is manufactured by immersing the aluminum drum substrate 1a having a length of 260 mm and a diameter of 30 mm in a solution consisting of 5 parts of a nylon copolymer, 40 parts of methanol and 60 parts of n-butanol to form a 0.6 μm thick underlying layer (not shown). A dispersion is prepared by dispersing 10 parts of a titanyl phthalocyanine pigment and 10 parts of polyvinyl butyral resin in 100 parts of cyclohexanone with a sand mill device (not shown) for 15 hours. 25 parts of methyl ethyl ketone is added to the dispersion and the resulting mixture is applied to the above underlying layer to form the 0.20 μm thick charge generation layer 1b.

A polycarbonate resin having a number average molecular weight of 100,000 and 10 parts of a hydrazone compound are dissolved in 80 parts of monochlorobenzene and the resulting solution is applied to the above charge generation layer 1b to form the 25 μm thick charge transport layer 1c. The NESA sensitivity of the obtained photosensitive drum 1 in this embodiment was 2,200 (V·cm²/μJ).

FIG. 7 shows the evaluation results of the dot repeatability and the formation of a moire image in Experimental Example 3 and Comparative Examples 4 and 5 which differ in NESA sensitivity. The NESA sensitivity of the photosensitive drum 1 of Example 3 is 2,200 (V·cm²/μJ) and the photosensitive drums of Comparative Examples 4 and 5 are prepared by using an azo pigment in the charge generation layer and have a NESA sensitivity of 500 (V·cm²/μJ). In the image forming apparatuses of Experimental Example 3 and Comparative Examples 4 and 5, the resolution is set to 1,200 dpi, the process speed is set to 120 (mm/sec), the charge frequency is set to 1,200 (Hz), the surface potential of the exposed dark portion of the photosensitive drum is set to −600 (V), and the developing bias is set to −450 (V). The spot diameters of Experimental Example 3 and Comparative Example 4 are 60 (μm) and that of Comparative Example 5 is 30 (μm).

As is obvious from the evaluation results, in the case of the photosensitive drum 1 of Experimental Example 3 having a NESA sensitivity of 2,000 (V·cm²/μJ) or more, preferably 2,200 (V·cm²/μJ) or more, even when the ratio of the spot diameter of an exposure beam (laser beam) to the size of one pixel, that is, the spot ratio a is 2.5 or more, the dot repeatability of small-dot image was satisfactory and a moire image was not formed. Dot repeatability was low in Comparative Example 4 and a moire image was formed in Comparative Example 5.

In this embodiment, by adjusting the ratio of the spot diameter of an exposure beam (laser beam) to the size of one pixel, that is, the spot ratio α to 2.5 or more, preferably 2.83 or more, the number β of dots per cycle of charging voltage (=R×V/f) to a range of 4.2 to 7.0, preferably 4.72 to 6.30 and further the NESA sensitivity of the photosensitive drum 1 to 2,000 (V·cm²/μJ) or more, preferably 2,200 (V·cm²/μJ) or more, even when the resolution and the process speed are increased, a defective image can be prevented, charging sound can be suppressed and the excellent repeatability of small-dot image can be realized.

<Embodiment 2>

Figure 8:
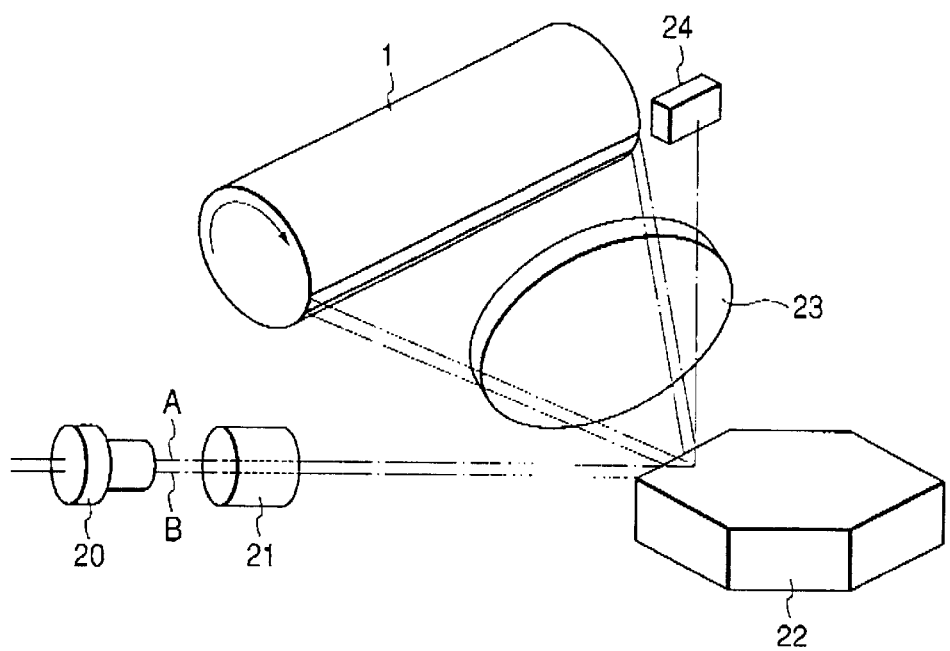
FIG. 8 is a schematic structural diagram of a double beam laser exposing device for the image forming apparatus according to Embodiment 2 of the present invention.

This embodiment will be described using the image forming apparatus of Embodiment 1 shown in FIG. 1. In the above Embodiment 1, a single beam laser exposing device 6 which generates a single laser beam is used. In this embodiment, as shown in FIG. 8, a double-beam laser exposing device 6a which generates two laser beams A and B is used. Other constituent elements and image forming operation are the same as those of Embodiment 1 and their descriptions are omitted.

As shown in FIG. 8, in the double-beam laser exposing device 6a, two laser beams A and B are generated from a double beam laser source 20 and polarized and scanned by a polygon mirror 22 which rotates at a high speed after passing through a collimator lens 21. The two laser beams A and B polarized and scanned by the polygon mirror 22 are used to scan and expose the charged photosensitive drum 1 through an fθ lens 23 for compensating for scanning speed. In this exposing device 6a, as two laser beams A and B scan the surface of the photosensitive drum 1 at the same time, the scanning of two lines is carried out. Reference numeral 24 denotes a position sensor for detecting the start of writing an image signal in the main scanning direction of the photosensitive drum 1.

Figure 9:
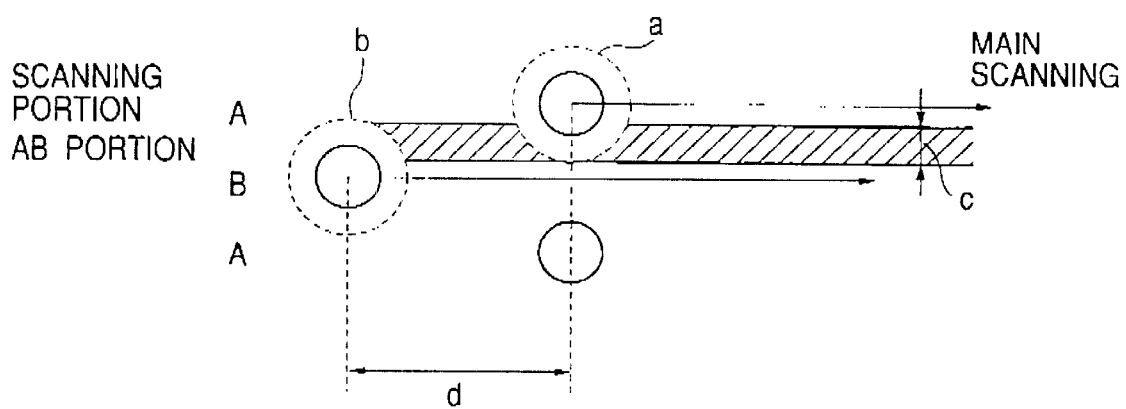
FIG. 9 is a conceptual diagram of a laser beam (exposure beam) for scanning the surface of the photosensitive drum of the exposing device in Embodiment 2 of the present invention.

FIG. 9 is a conceptual diagram of laser beams (exposing beams) for scanning the surface of the photosensitive drum 1 of the exposing device 6a used in this embodiment. In FIG. 9, when the position of the first laser beam A scanning the surface of the photosensitive drum 1 at a certain time is represented by "a", the second laser beam B scans a position "b" on the surface of the photosensitive drum 1 after the first laser beam A. These laser beams A and B scan at the fixed and same speed and there is always a positional difference "d" between them in the main scanning direction.

In the image forming apparatus using this double beam laser exposing device 6a, when the spot diameter is larger than the density of pixels, half-tone repeatability may deteriorate. This will be described hereinbelow.

As shown in FIG. 9, when the first laser beam A and the second laser beam B are irradiated, if the timing of generating the laser beam A and the timing of generating the laser beam B are close to each other (scanning lines A and B), the potential of an overlapped portion "c" tends to greatly drop as the potentials of the two laser beams become almost equal to each other when the two laser beams are irradiated at the same time.

Figure 10A:
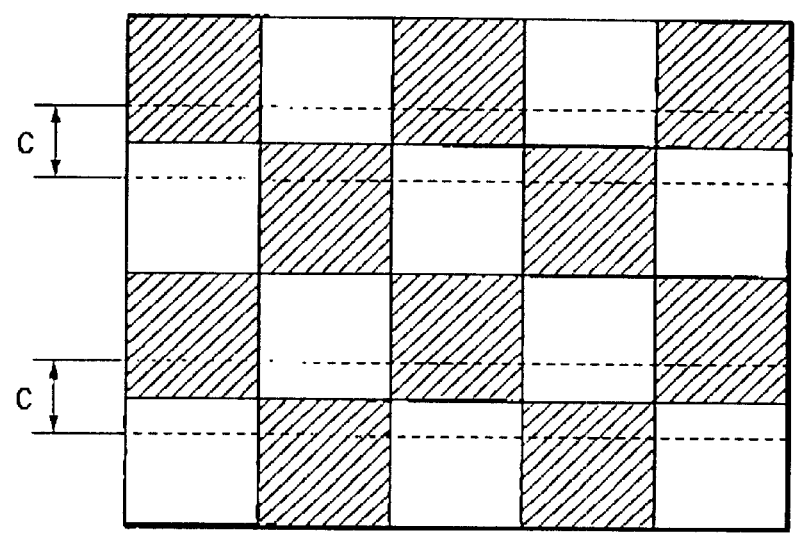
FIG. 10A is a diagram showing an example of a pattern image and FIG. 10B is a diagram showing the state that dots of a pattern image are connected to each other.
Figure 10B:
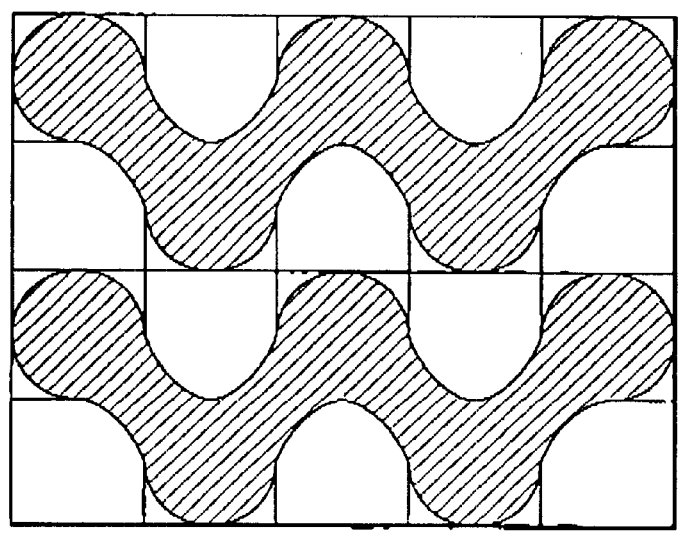

Therefore, in a pattern image (slant line portion) which is divided for each dot as shown in FIG. 10A, adjacent one-dot images shown in FIG. 10B are connected to each other. Even in a half-tone image, a scanning line AB portion scanned at the same time may have a deeper potential than a scanning line BA portion and adjacent dots may be connected to each other. A photographic image using half-tone may become a nonuniform image.

FIG. 11 shows the evaluation results of dot connection and the formation of a moire image in Experimental Examples 4 to 6 and Comparative Examples 6 and 7 at a resolution of 1,200 dpi, a process speed of 150 mm/sec and a charging frequency of 1,200 (Hz) when the spot diameter and the NESA sensitivity of the photosensitive drum 1 are changed. In Experimental Examples 4 to 6 and Comparative Examples 6 and 7, the quantity of laser light is adjusted to obtain the same line width. In the image forming apparatus of Experimental Example 4, the resolution is set to 1,200 dpi, the process speed is set to 150 (mm/sec), the spot diameter is set to 60 ($\mu$m) and the NESA sensitivity of the photosensitive drum 1 is set to 2,500 (V·cm$^2$/$\mu$J).

As a result of studies on the evaluation results, in the image forming apparatus of Experimental Example 4, dot connection and the formation of a moire image could be prevented by adjusting the ratio of the spot diameter of an exposure beam (laser beam) to the size of one pixel, that is, the spot ratio α to 2.5 or more, preferably 2.83 or more and 4.3 or less, more preferably 4.25 or less (2.5≦α≦4.3) and the NESA sensitivity γ of the photosensitive drum 1 to 2,000 (V·cm$^2$/$\mu$J) or more, preferably 2,500 (V·cm$^2$/$\mu$J) or more and 3,500 (V·cm$^2$/$\mu$J) or less (2,000≦γ≦3,500). Dot connection occurred in Experimental Examples 5 and 6, a moire was formed in Comparative Example 6 and a small-dot image was not repeated in Comparative Example 7.

Thus, in the image forming apparatus of this embodiment which comprises the double beam laser exposing device 6a, dot connection and the formation of a moire image can be prevented and the same effect as Embodiment 1 could be obtained by adjusting the ratio of the spot diameter of an exposure beam (laser beam) to the size of one pixel, that is, the spot ratio α to 2.5 or more, preferably 2.83 or more and 4.3 or less, more preferably 4.25 or less (2.5≦α≦4.3) and the NESA sensitivity of the photosensitive drum 1 to 2,000 (V·cm$^2$/$\mu$J) or more, preferably 2,500 (V·cm$^2$/$\mu$J) or more and 3,500 (V·cm$^2$/$\mu$J) or less (2,000≦γ≦3,500).

In this embodiment, a double beam laser exposing device which irradiates two laser beams L1 and L2 at the same time is used. The present invention is not limited to this and the same effect can be obtained from an image forming apparatus which comprises a multi-beam laser exposing device which irradiates two or more laser beams.

<Embodiment 3>

Figure 12:
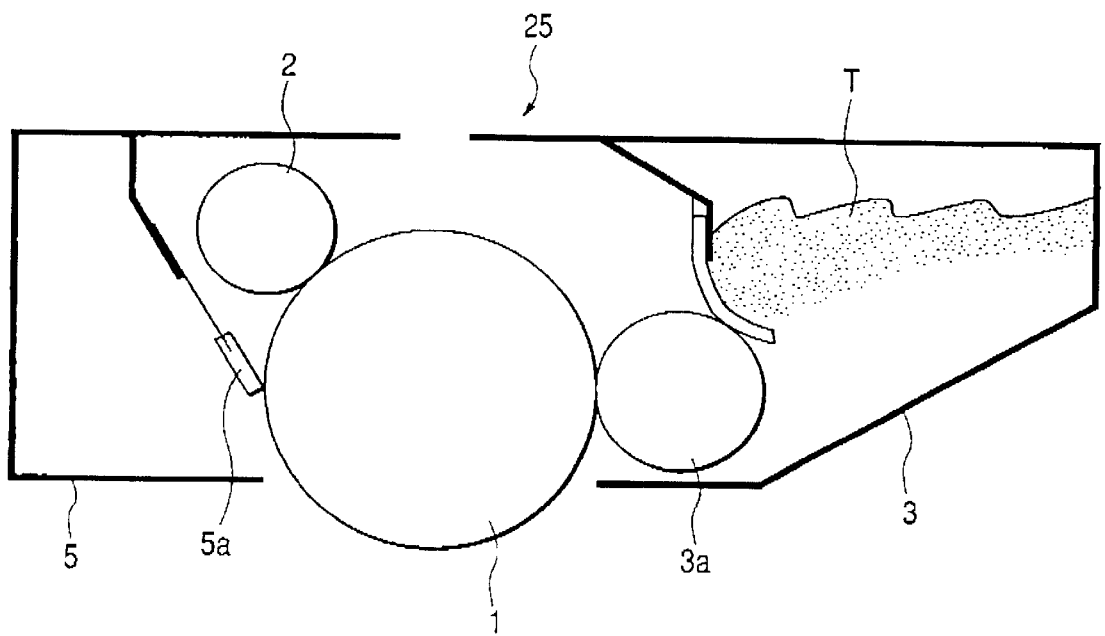
FIG. 12 is a schematic sectional view of a process cartridge according to Embodiment 3 of the present invention.

In this embodiment, as shown in FIG. 12, the photosensitive drum 1, charging roller 2, developing apparatus 3 and cleaning apparatus 5 including a cleaning blade 5a of the image forming apparatus of Embodiment 1 or 2 shown in FIG. 1 are integrally stored in a cartridge to construct a process cartridge 20 which is attachable to and detachable from the image forming apparatus. Other constituent elements are the same as those of Embodiment 1 or 2 and their descriptions are omitted.

The same effect as Embodiments 1 and 2 can be obtained in this embodiment in which the photosensitive drum 1, charging roller 2, developing apparatus 3 and cleaning apparatus 5 are integrally stored in a cartridge to form a process cartridge 25.

The photosensitive drum 1, charging roller 2, developing apparatus 3 and cleaning apparatus 5 are worn out through long-time use, thereby deteriorating the quality of an image. However, in the case of the process cartridge 25 as in this embodiment, a user exchange this process cartridge 25 to always enable the formation of a satisfactory image by preventing deterioration in the quality of an image and eliminate the need of maintenance.

As described above, when the ratio of the spot diameter of an exposure beam to the size of one pixel obtained from the pixel density of an electrostatic latent image, that is, the spot ratio is represented by α, the pixel density of an electrostatic latent image is represented by R (dot/mm), the process speed of an electrophotographic sensitive body is represented by V (mm/sec), the frequency of AC voltage applied by charging bias application means is represented by f (Hz) and the number of dots per cycle of charging bias is represented by β (=R×V/f), by setting 2.5≦α and 4.2≦β≦7.0 and the NESA sensitivity γ (V·cm$^2$/$\mu$m) of an electrophotographic sensitive body to 2,000≦γ, even if the resolution and the process speed are increased, a defective image can be prevented, charging sound can be suppressed and the excellent repeatability of small-dot image can be retained.

What is claimed is:

1. An electrophotographic apparatus comprising:

a photosensitive body:

a charging member, provided to be capable of contacting with said photosensitive body, for charging said photosensitive body, an oscillating voltage being applied to said charging member; and exposing means for exposing said photosensitive body charged by said charging member, by an exposure beam based on image information to form an electrostatic image, wherein when a spot ratio which is a ratio of a spot diameter of the exposure beam to a size of one pixel of the electrostatic image is represented by $\alpha$, a pixel density of the electrostatic image is represented by R (dot/mm), a process speed of said photosensitive body is represented by V (mm/sec), a frequency of the oscillating voltage is represented by f (Hz) and a NESA sensitivity of said photosensitive body is represented by $\gamma$ (V·cm$^2$/$\mu$m), $2.5 \leq \alpha$, $4.2 \leq R \times V/f \leq 7.0$, and $2,000 \leq \gamma$ are satisfied.

2. An electrophotographic apparatus according to claim 1, wherein $2.83 \leq \alpha$ is satisfied.

3. An electrophotographic apparatus according to claim 1, wherein said exposing means exposes said photosensitive body by a plurality of exposure beams based on the image information to form an electrostatic image of a plurality of lines on said photosensitive body at the same time.

4. An electrophotographic apparatus according to claim 3, wherein $\alpha \leq 4.3$ and $\gamma \leq 3,500$ are satisfied.

5. An electrophotographic apparatus according to claim 3, wherein $\alpha \leq 4.25$ and $2,500 \leq \gamma \leq 3,500$ are satisfied.

6. An electrophotographic apparatus according to claim 1, wherein said charging member is shaped like a roller.

7. An electrophotographic apparatus according to claim 1, wherein the exposure beam is a laser beam.

8. An electrophotographic apparatus according to claim 1, further comprising developing means for developing the electrostatic image with a developer.

9. An electrophotographic apparatus according to claim 8, wherein a charging polarity of said charging member is the same as that of the developer.

10. An electrophotographic apparatus according to claim 1, wherein said photosensitive body and said charging member are provided in a process cartridge which is attachable to and detachable from a main body of said electrophotographic apparatus.

* * * * *

UNITED STATES PATENT AND TRADEMARK OFFICE
CERTIFICATE OF CORRECTION

PATENT NO. : 6,529,221 B2
DATED : March 4, 2003
INVENTOR(S) : Kazumi Yamauchi

It is certified that error appears in the above-identified patent and that said Letters Patent is hereby corrected as shown below:

<u>Column 8,</u>
Line 52, "a" should read -- α --.

<u>Column 11,</u>
Line 3, "body:" should read -- body; --.

Signed and Sealed this

Seventh Day of October, 2003

JAMES E. ROGAN
*Director of the United States Patent and Trademark Office*